United States Patent [19]
Shibahata

[11] Patent Number: 6,064,930
[45] Date of Patent: May 16, 2000

[54] YAW MOMENT CONTROL SYSTEM IN VEHICLE

[75] Inventor: Yasuji Shibahata, Wako, Japan

[73] Assignee: Honda Giken Kogyo Kabushiki Kaisha, Tokyo, Japan

[21] Appl. No.: 08/968,236

[22] Filed: Nov. 12, 1997

[30] Foreign Application Priority Data

Nov. 13, 1996 [JP] Japan .................................. 8-301724

[51] Int. Cl.[7] .......................... B60K 23/04; F15B 11/02
[52] U.S. Cl. .............................. 701/36; 701/69; 701/72
[58] Field of Search ............................. 701/36, 69, 82, 701/88, 72, 41; 180/76

[56] References Cited

U.S. PATENT DOCUMENTS

| | | | |
|---|---|---|---|
| 5,151,072 | 9/1992 | Shibahata | 180/245 |
| 5,259,476 | 11/1993 | Matsuno et al. | 180/197 |
| 5,376,868 | 12/1994 | Toyoda et al. | 318/587 |
| 5,417,298 | 5/1995 | Shibahata | 180/76 |
| 5,548,513 | 8/1996 | Masuda et al. | 701/88 |
| 5,701,247 | 12/1997 | Sasaki | 701/69 |
| 5,742,917 | 4/1998 | Matsuno | 701/69 |
| 5,752,575 | 5/1998 | Knoishi et al. | 180/76 |

FOREIGN PATENT DOCUMENTS

9-86203  3/1997  Japan .

*Primary Examiner*—Tan Nguyen
*Attorney, Agent, or Firm*—Arent, Fox Kintner Plotkin & Kahn

[57] ABSTRACT

A yaw moment control system for a vehicle is provided to prevent the reduction of the turning performance during traveling of a vehicle at a low speed, which is designed, so that a driving force and a braking force are distributed to inner and outer wheels during turning of the vehicle in order to eliminate an over-steering tendency produced upon deceleration of the vehicle during turning thereof, thereby enhancing the stability during traveling of the vehicle at a high speed. A longitudinal acceleration Xg calculated in a longitudinal acceleration calculating circuit, a lateral acceleration Yg calculated in a lateral acceleration calculating circuit and a correcting factor Kv determined in a correcting factor determining circuit are multiplied by a control amount calculating circuit. Torque proportional to the resulting product is distributed to left and right wheels to eliminate the over-steering tendency produced upon deceleration of the vehicle during the turning thereof. When the vehicle is being decelerated and the vehicle speed V is smaller, the correcting factor Kv assumes a value smaller than 1.0, and at the other time, the correcting factor Kv assumes a value of 1.0. Therefore, when the vehicle is traveling at a low vehicle speed, an under-steering tendency can be prevented from being produced by the distribution of the torque, thereby preventing the reduction in turning performance.

1 Claim, 5 Drawing Sheets

YAW MOMENT CONTROL SYSTEM IN VEHICLE

BACKGROUND OF THE INVENTION

1. Field of the Invention

The present invention relates to a yaw moment control system in a vehicle, in which the steering characteristic is changed by distributing different amounts of torque to left and right wheels.

2. Description of the Prior Art

There is a conventionally known yaw moment control system in a vehicle which has already been proposed by the present assignee and which is designed to control the yaw moment by generating a driving force in one of the left and right vehicle wheels which are connected to each other by a gear box and a torque transmitting clutch, and generating a braking force in the other wheel. An undesirable yaw moment generated upon acceleration or deceleration of the vehicle when it is being turned, is eliminated by setting the distribution amounts of the driving force and the braking force as a function of a product of the longitudinal acceleration and the lateral acceleration (see Japanese Patent Application Laid-open No. 9-86203).

In the above known system, the stability during traveling of the vehicle particularly at a high speed is enhanced by distributing the driving force to an inner wheel during turning of the vehicle and distributing the braking force to an outer wheel during turning of the vehicle in order to eliminate an over-steering tendency generated during deceleration of the vehicle. It is possible to enhance the stability in the deceleration of the vehicle during traveling thereof at a high speed by the above-described control. However, if the same control is carried out in the deceleration of the vehicle during traveling thereof at a low speed, there is a possibility of an under-steering tendency is increased by the excessive control to provide a sense of incompatibility to a driver.

In the above known system, an output signal from a lateral acceleration sensor and an output signal from a steering angle sensor are used for calculating a lateral acceleration. However, when the vehicle is decelerating, a driver may perform a counter-steering in some cases and hence, if the output signal from the steering angle sensor is used during deceleration of the vehicle, there is a possibility that the actual direction of turning of the vehicle and the output signal from the steering angle sensor do not correspond to each other.

SUMMARY OF THE INVENTION

The present invention has been accomplished with the above circumstance in view, and it is an object of the present invention to solve the above problems which arise during deceleration of the vehicle, thereby properly performing the control of the yaw moment.

According to the present invention, when the torque distribution amount determining means determines an amount of torque distributed in a direction to inhibit the turning of the vehicle in accordance with a negative longitudinal acceleration (i.e., deceleration) calculated by the longitudinal acceleration calculating means, the amount of torque distributed in the direction to inhibit the turning of the vehicle is increased in accordance with an increase in vehicle speed detected by the vehicle speed detecting means. Therefore, it is possible to ensure the turning performance without inhibiting the under-steering tendency produced due to the deceleration of the vehicle during traveling of the vehicle at a low speed, and to inhibit over-steering tendency produced due to the deceleration of the vehicle during traveling of the vehicle at a high speed by the distribution of the torque, thereby ensuring high-speed stability.

According to a further feature of the present invention, when the longitudinal acceleration calculating means calculates a positive longitudinal acceleration (i.e., during acceleration of the vehicle), the torque is distributed in a direction to assist the turning of the vehicle, based on the longitudinal acceleration and the lateral acceleration calculated by the lateral acceleration calculating means in accordance with the output from the steering angle sensor. When the longitudinal acceleration calculating means calculates a negative longitudinal acceleration (i.e., during deceleration of the vehicle), the torque is distributed in the direction to inhibit the turning of the vehicle based on the longitudinal acceleration and the lateral acceleration calculated by the lateral acceleration calculating means in accordance with the output signal from at least one of the yaw rate sensor and the lateral acceleration sensor.

During acceleration of the vehicle when the turning of the vehicle may be assisted by the distribution of the torque, the output from the steering angle sensor reflecting the driver's intention (the steering operation) is used and hence, a steering feeling free from a sense of incompatibility can be obtained. Even if the actual direction of turning of the vehicle and the output signal from the steering angle sensor do not correspond to each other by the counter-steering operation during deceleration of the vehicle which permits the turning of the vehicle to be inhibited by the distribution of the torque, there is no hindrance, because of the use of the output from at least one of the yaw rate sensor and the lateral acceleration sensor which represent the actual direction of turning of the vehicle.

BRIEF DESCRIPTION OF THE DRAWINGS

The mode for carrying out the present invention will be now be described by way of an embodiment shown in the accompanying drawings.

DETAILED DESCRIPTION OF THE PREFERRED EMBODIMENT

Figure 1:
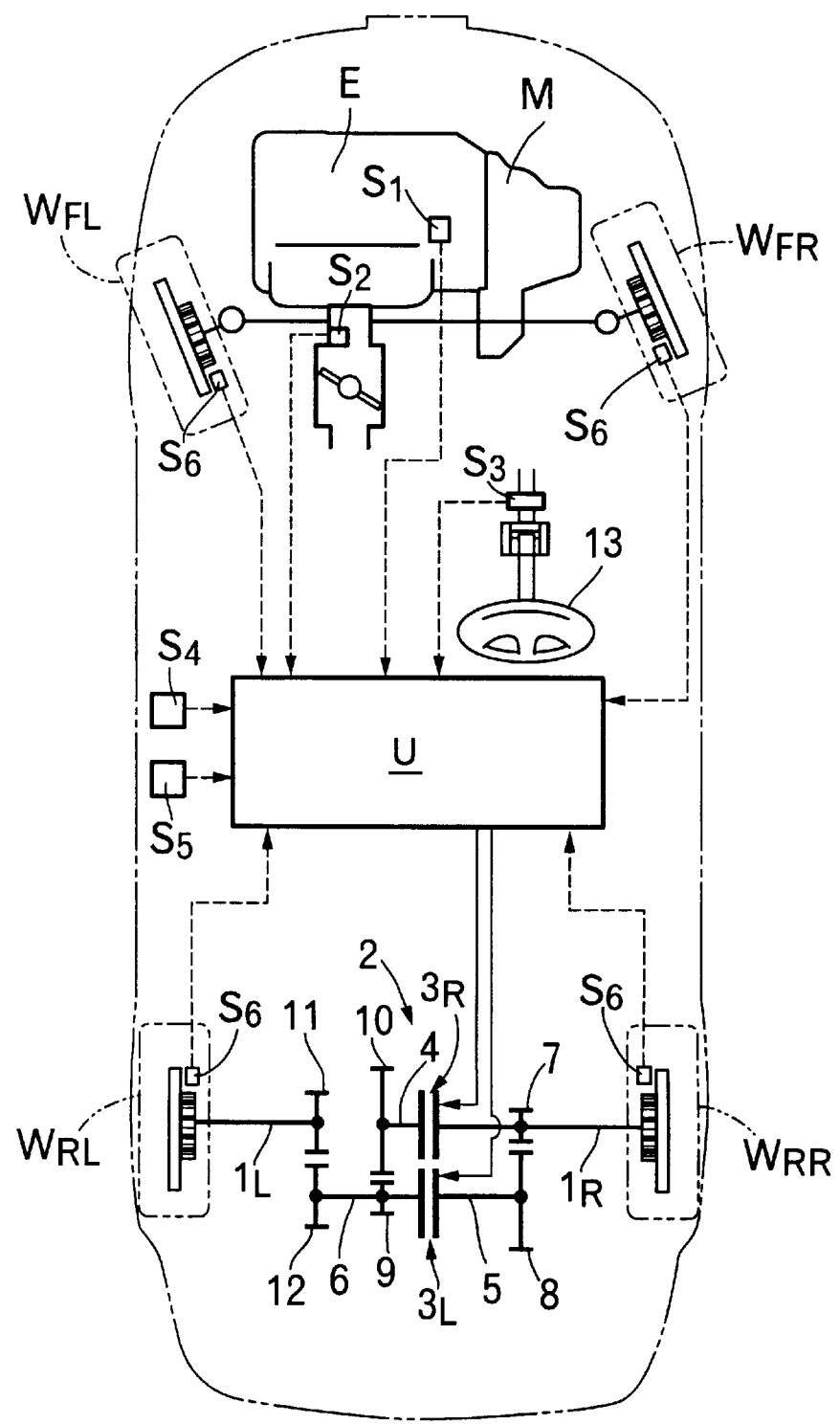
FIG. 1 is an illustration of the entire arrangement of a front engine and front drive vehicle equipped with a torque distribution control system according to an embodiment of the present invention.

As shown in FIG. 1, a transmission M is connected to a right side of an engine E laterally mounted on a front portion of a vehicle body, and left front wheel $W_{FL}$ and a right front wheel $W_{FR}$ which are driven wheels, are driven by the engine E and the transmission M.

A gear box 2 is mounted between axles $1_L$ and $1_R$ of left and right rear wheels $W_{RL}$ and $W_{RR}$ which are follower wheels. The gear box 2 connects the left and right rear wheels $W_{RL}$ and $W_{RR}$, so that they are rotated at a different number of rotations. The gear box 2 forms the torque distributing means according to the embodiment of the present invention and is provided with a first hydraulic clutch $3_L$ and a second hydraulic clutch $3_R$. If the first hydraulic clutch $3_L$ is brought into its engaged state, the number of rotations of the left rear wheel $W_{RL}$ is decreased, while the number of rotations of the right rear wheel $W_{RR}$ is increased. If the second hydraulic clutch $3_R$ is brought into its engaged state, the number of rotations of the right rear wheel $W_{RR}$ is decreased, while the number of rotations of the left rear wheel $W_{RL}$ is increased.

The gear box 2 includes a first shaft 4 disposed coaxially with the left and right axles $1_L$ and $1_R$, and a second shaft 5 and a third shaft 6 which are disposed in parallel to the left and right axles $1_L$ and $1_R$ and coaxially with each other. The first hydraulic clutch $3_L$ is disposed between the second shaft 5 and the third shaft 6, and the second hydraulic clutch $3_R$ is disposed between the right axle $1_R$ and the first shaft 4. A first gear 7 having a smaller diameter and provided on the right axle $1_R$, is meshed with a second gear 8 having a larger diameter and provided on the second shaft 5, and a third gear 9 having a smaller diameter and provided on the third shaft 6, is meshed with a fourth gear 10 having a larger diameter and provided on the first shaft 4. A fifth gear 11 provided on the left axle $1_L$ is meshed with a sixth gear 12 provided on the third shaft 6.

The number of teeth of the first and third gears 7 and 9 are set, so that they are the same, and the number of teeth of the second and fourth gears 8 and 10 are set, so that they are the same and larger than the number of teeth of the first and third gears 7 and 9. The number of teeth of the fifth and sixth gears 11 and 12 are set, so that they are the same.

Therefore, if the first hydraulic clutch $3_L$ is brought into its engaged state, the right rear wheel $W_{RR}$ is connected to the left rear wheel $W_{RL}$ through the right axle $1_R$, the first gear 7, the second gear 8, the second shaft 5, the first hydraulic clutch $3_L$, the third shaft 6, the sixth gear 12, the fifth gear 11 and the left axle $1_L$. At this time, the number of rotations of the left rear wheel $W_{RL}$ is increased relative to the number of rotations of the right rear wheel $W_{RR}$ in accordance with the ratio of the number of teeth of the first gear 7 to the number of teeth of the second gear 8. Thus, if the first hydraulic clutch $3_L$ is brought into its engaged state in a condition in which the left and right rear wheels $W_{RL}$ and $W_{RR}$ are being rotated at the same speed, the number of rotations of the right rear wheel $W_{RR}$ is increased, and the number of rotations of the left rear wheel $W_{RL}$ is decreased.

If the second hydraulic clutch $3_R$ is brought into its engaged state, the right rear wheel $W_{RR}$ is connected to the left rear wheel $W_{RL}$ through the right axle $1_R$, the second hydraulic clutch $3_R$, the first shaft 4, the fourth gear 10, the third gear 9, the third shaft 6, the sixth gear 12, the fifth gear 11 and the left axle $1_L$. At this time, the number of rotations of the left rear wheel $W_{RL}$ is increased relative to the number of rotations of the right rear wheel $W_{RR}$ in accordance with the ratio of the number of teeth of the fourth gear 10 to the number of teeth of the third gear 9. Thus, if the second hydraulic clutch $3_R$ is brought into its engaged state in a condition in which the left and right rear wheels $W_{RL}$ and $W_{RR}$ are being rotated at the same speed, the number of rotations of the right rear wheel $W_{RR}$ is decreased, and the number of rotations of the left rear wheel $W_{RL}$ is increased.

Engagement forces of the first and second hydraulic clutches $3_L$ and $3_R$ can be continuously controlled by adjusting the magnitude of hydraulic pressures applied to the first and second hydraulic clutches $3_L$ and $3_R$. Therefore, the ratio of the number of rotations of the left rear wheel $W_{RL}$ to the number of rotations of the right rear wheel $W_{RR}$ is also continuously controlled within a range depending upon the tooth ratio among the first to fourth gears 7, 8, 9 and 10.

Signals from an engine revolution-number sensor $S_1$ for detecting a number of revolutions of the engine E, an intake pipe internal absolute pressure sensor $S_2$ for detecting an internal absolute pressure in an intake pipe of the engine E, a steering angle sensor $S_3$ for detecting a steering angle of a steering wheel 13, a lateral acceleration sensor $S_4$ for detecting a lateral acceleration of the vehicle body, a yaw rate sensor $S_5$ for detecting a yaw rate of the vehicle body, and wheel speed sensors $S_6$ for detecting the number of rotations of the four wheels respectively to calculate a vehicle speed are applied to an electronic control unit U.

Figure 2:
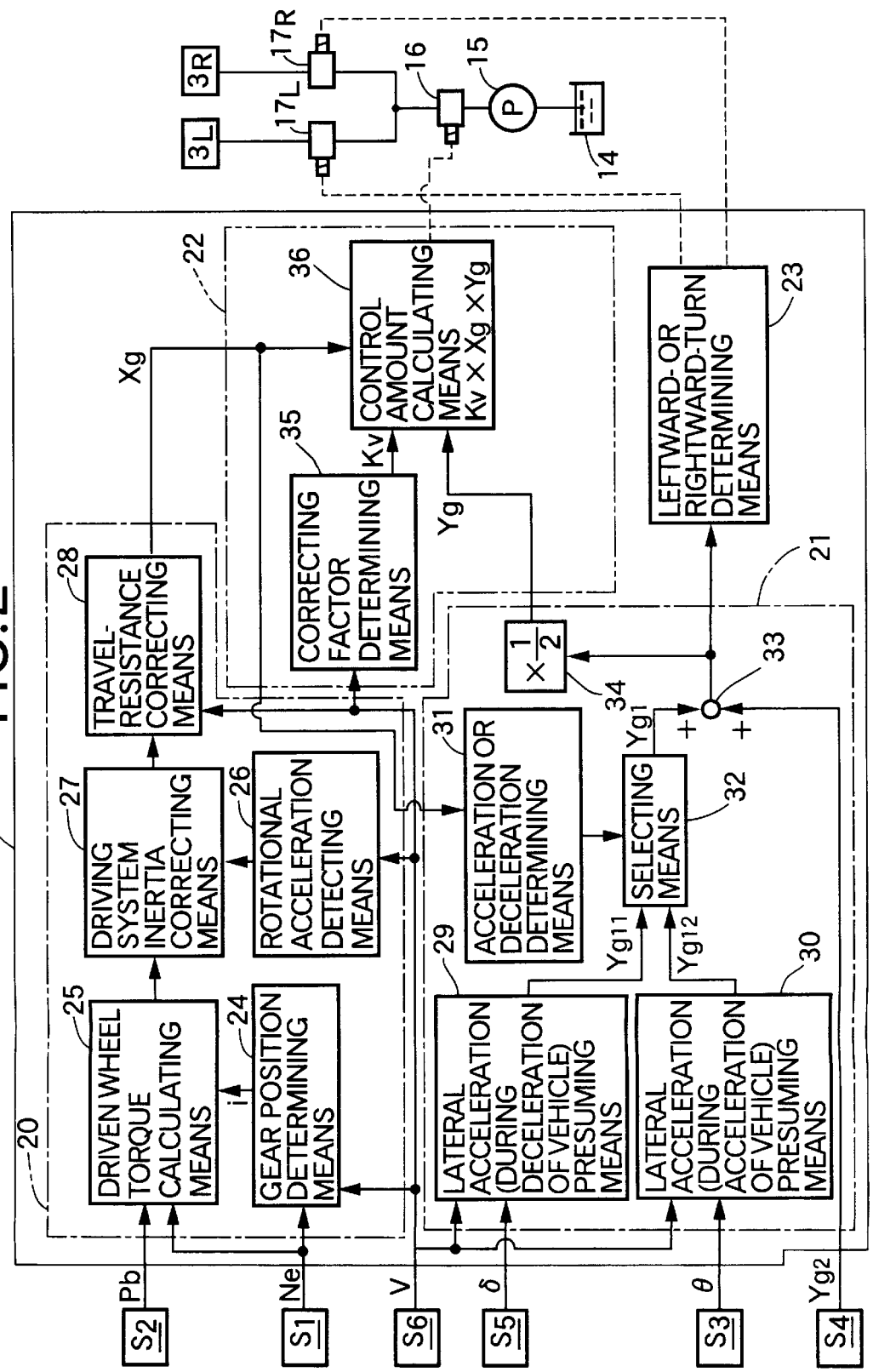
FIG. 2 is a block diagram showing the circuit arrangement of an electronic control unit according to the embodiment of the present invention.

As can be seen from FIG. 2, the electronic control unit U is provided with a longitudinal acceleration calculating means 20, a lateral acceleration calculating means 21, a torque distribution determining means 22, and a leftward- or rightward-turn determining means 23. The longitudinal acceleration calculating means 20 comprises a gear position determining means 24, a driven wheel torque calculating means 25, a rotational acceleration detecting means 26, a driving system inertia correcting means 27, and a travel-resistance correcting means 28. The lateral acceleration calculating means 21 comprises a lateral acceleration (during deceleration of vehicle) presuming means 29, a lateral acceleration (during acceleration of vehicle) presuming means 30, an acceleration or deceleration determining means 31, a selecting means 32, an adding means 33 and an average value calculating means 34. The torque distribution determining means 22 comprises a correcting factor determining means 35, and a control amount calculating means 36.

Oil pumped from an oil pan 14 by an oil pump 15 is regulated in pressure by a regulator valve 16 having a linear solenoid valve, and the oil is supplied to the first hydraulic clutch $3_L$ through a first on/off valve $17_L$ and to the second hydraulic clutch $3_R$ through a second on/off valve $17_R$. The electronic control unit U controls the magnitude of the output hydraulic pressure from the regulator valve 16 and the opening and closing of the first and second on/off valves $17_L$ and $17_R$ in order to bring one of the first and second hydraulic clutches $3_L$ and $3_R$ of the gear box 2 into an engaged state to generate a braking force in one of the left and right rear wheels $W_{RL}$ and $W_{RR}$ and to generate a driving force in the other.

The calculation of a longitudinal acceleration Xg by the longitudinal acceleration calculating means 20 will be described below. The gear position determining means 24 determines the gear position of the transmission M based on a number of revolutions Ne of the engine detected by the engine revolution-number sensor $S_1$ and a vehicle speed V detected by the wheel speed sensors $S_6$. The driven wheel torque calculating means 25 calculates the engine torque based on an internal absolute pressure Pb in the intake pipe detected by the intake pipe internal absolute pressure sensor $S_2$ and the number of revolutions Ne of the engine, and calculates driven wheel torque by adding a correction provided by a gear ratio i of the detected gear position. The rotational acceleration detecting means 26 detects a rotational acceleration of the driving system based on the vehicle speed V, and the driving system inertia correcting means 27 corrects the driven wheel torque by the rotational acceleration of the driving system. Further, the travel-resistance correcting means 28 corrects the driven wheel torque by the travel resistance detected based on the vehicle speed V, thereby finally calculating a longitudinal acceleration Xg of the vehicle.

The calculation of a lateral acceleration Yg by the lateral acceleration calculating means 21 will be described. In calculating the lateral acceleration (during deceleration of vehicle), presuming means 29 calculates a presumed lateral acceleration $Yg_{11}$ during deceleration of the vehicle by multiplying a yaw rate δ detected by the yaw rate sensor $S_5$ by the vehicle speed V. On the other hand, in calculating the lateral acceleration (during acceleration of vehicle), presuming means 30 searches a presumed lateral acceleration $Yg_{12}$ during acceleration of the vehicle from a map based on a steering angle θ detected by the steering angle sensor $S_3$ and the vehicle speed V. The acceleration or deceleration determining means 31 determines whether the vehicle is in an accelerating state or in a decelerating state, based on the positive or negative value of the longitudinal acceleration Xg calculated in the longitudinal acceleration calculating means 20. Specifically, if the longitudinal acceleration Xg is of a negative value, it is determined that the vehicle is in the decelerating state. If the longitudinal acceleration Xg is of a positive value, it is determined that the vehicle is in the accelerating state.

The selecting means 32 outputs one of the presumed lateral acceleration $Yg_{11}$ during deceleration of the vehicle and the presumed lateral acceleration $Yg_{12}$ during acceleration of the vehicle as a presumed lateral acceleration $Yg_1$, and in particular, the presumed lateral acceleration $Yg_{11}$, if the vehicle is in the decelerating state, and the presumed lateral acceleration $Yg_{12}$, if the vehicle is in the accelerating state. The adding means 33 adds the presumed lateral acceleration $Yg_1$ selected in the selecting means 32 and an actual lateral acceleration $Yg_2$ detected by the lateral acceleration sensor $S_4$. The average value calculating means 34 calculates the lateral acceleration Yg which is an average value between the presumed lateral acceleration $Yg_1$ and the actual lateral acceleration $Yg_2$ by multiplying a value resulting from the addition of $Yg_1$ and $Yg_2$ by ½.

By calculating the lateral acceleration as the average value between the presumed lateral acceleration $Yg_1$ and the actual lateral acceleration $Yg_2$ in the above manner, it is possible not only to provide an accurate lateral acceleration Yg without a time lag, but also to exhibit a fail-safe function when one of the presumed lateral acceleration $Yg_1$ and the actual lateral acceleration $Yg_2$ cannot be calculated.

Figure 5:
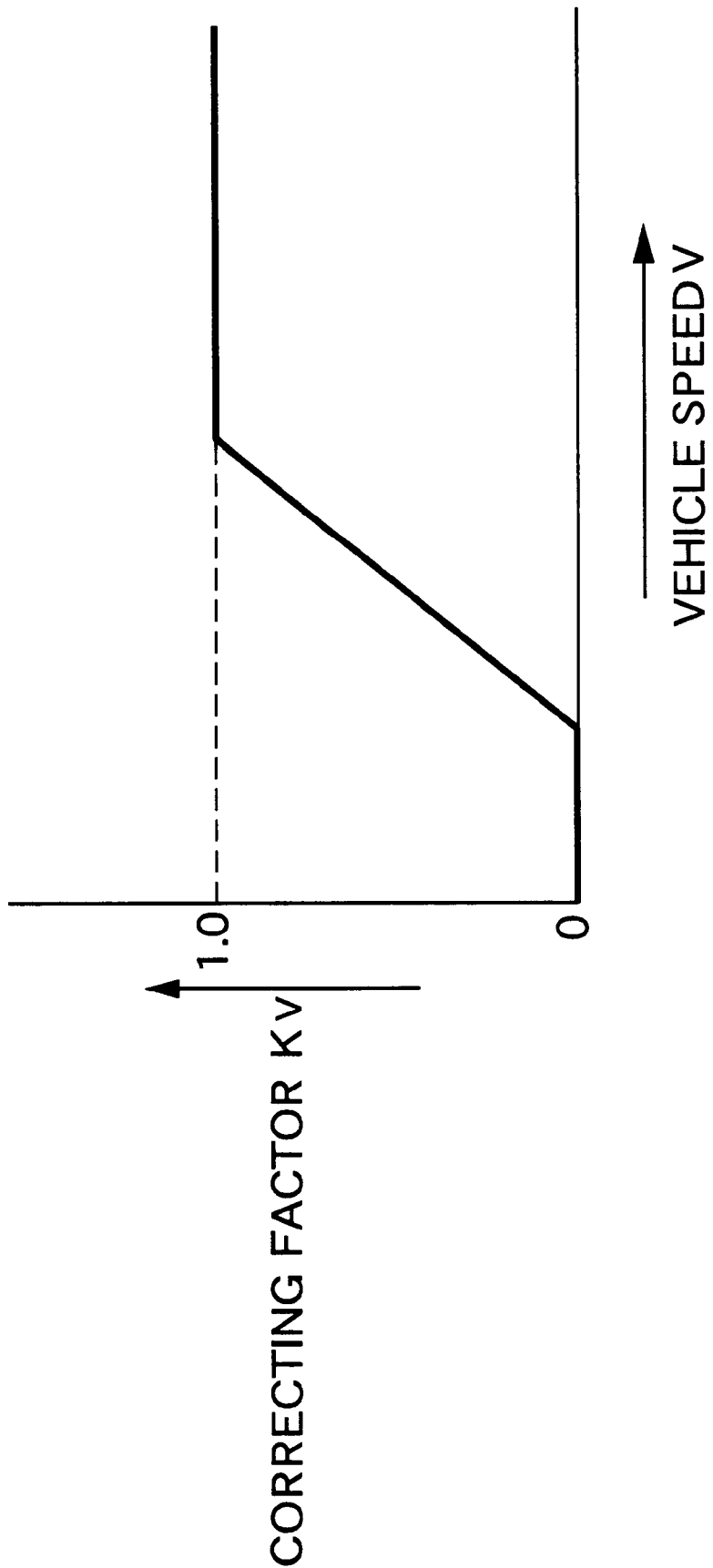
FIG. 5 is a graph illustrating the relationship between the vehicle speed V and the correcting factor Kv.

The correcting factor determining means 35 of the torque distribution amount determining means 22 determines a correcting factor Kv by the map searching based on the vehicle speed V, when the acceleration or deceleration determining means 31 determines that the vehicle is in the decelerating state. As shown in FIG. 5, the correcting factor Kv is set at 0 (zero) in a lower range of vehicle speed; increased linearly from 0 to 1.0 in a medium range of vehicle speed; and held at 1.0 in a higher range of vehicle speed. The control amount calculating means 36 calculates a control amount for the regulator valve 16, namely, a torque amount distributed between the left and right rear wheels $W_{RL}$ and $W_{RR}$ by multiplying the correcting factor Kv, the longitudinal acceleration Xg and the lateral acceleration Yg by one another. When the vehicle is in the accelerating state, the correcting factor Kv is held at 1.0.

The control amount calculated in the control amount calculating means 36, i.e., the torque amount distributed between the left and right rear wheels $W_{RL}$ and $W_{RR}$ is set, so that it is proportional to Xg×Yg which is a product of the longitudinal acceleration Xg and the lateral acceleration Yg. The reason will be described below.

Figure 3:
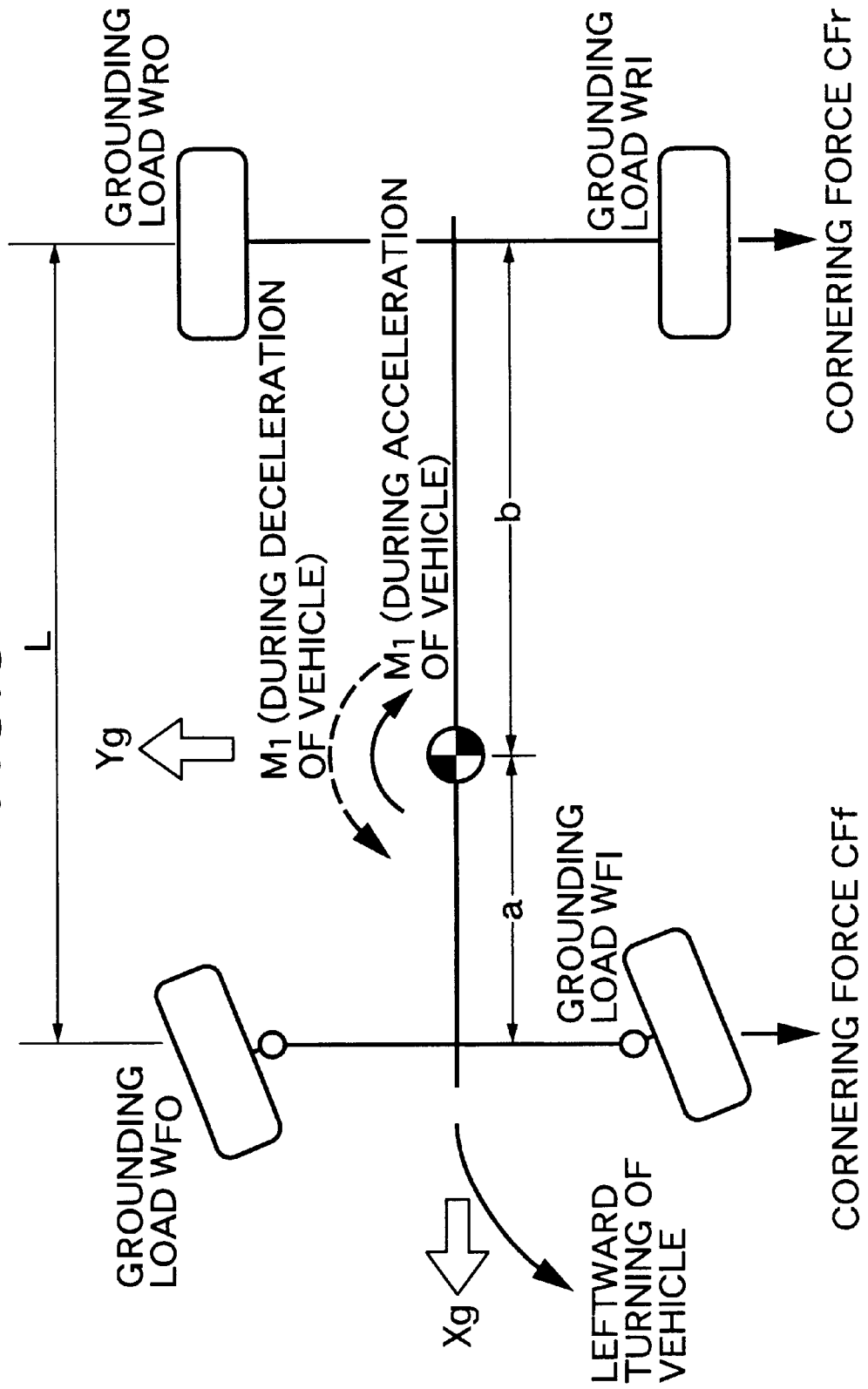
FIG. 3 is an illustration for explaining a yaw moment generated in the vehicle during turning of the vehicle.

FIG. 3 illustrates a state in which the vehicle having a weight W is being turned leftwards. In this case, a centrifugal force W×Yg is applied at the position of the center of gravity of the vehicle and balanced with the sum of a cornering force CFf applied between the front wheels and a road surface and a cornering force CFr applied between the rear wheels and the road surface.

$$W \times Yg = CFf + CFr \qquad (1)$$

If the distance between the position of the gravity center of the vehicle and the front wheels is represented by a, and the distance between the position of the gravity center of the vehicle and the rear wheels is represented by b, a moment $M_1$ provided about the yaw axis by the cornering forces CFf and CFr is given according to $$M_1 = a \times CFf - b \times CFr \qquad (2)$$

When the vehicle is traveling straight, the grounding loads of the left and right wheels are equal to each other, but when the vehicle is being turned, the grounding loads of the inner and outer wheels during turning of the vehicle are different from each other. Thus, during turning of the vehicle, a centrifugal force directed outwards in the turning direction is applied to the center of gravity of the vehicle body and for this reason, the vehicle body tends to move outwards in the turning direction. As a result, there is a tendency for the inner wheel during turning of the vehicle, to float or lift from the road surface, whereby the grounding load of the inner wheel during turning of the vehicle is decreased, and there is a tendency for the outer wheel during turning of the vehicle to be urged against the road surface, whereby the grounding load of the outer wheel during turning of the vehicle, is increased.

When the vehicle is traveling at a constant speed, the grounding loads of the front and rear wheels are constant, but when the vehicle is accelerating or decelerating, the grounding loads of the front and rear wheels are varied. Specifically, during acceleration of the vehicle, an inertial force directed rearwards of the vehicle body, is applied to the center of gravity of the vehicle body and hence, the vehicle body tends to be tail-dived, whereby the grounding load of the rear wheel is increased. As a result, the cornering force of the rear wheel is increased to apply a moment $M_1$ in a direction opposite from the turning direction. During deceleration of the vehicle, an inertial force directed forwards of the vehicle body, is applied to the center of gravity of the vehicle body and hence, the vehicle body tends to nose-dive, whereby the grounding load of the front wheel is increased. As a result, the cornering force of the front wheel is increased to apply a moment $M_1$ in the same direction as the turning direction (see an arrow shown by a solid line and an arrow shown by a dashed line in FIG. 3).

When the vehicle is traveling straight at a constant speed, the grounding load of each of the front wheels is Wf/2, wherein Wf represents the sum of the grounding loads of the left and right front wheels. However, when the vehicle is accelerating or decelerating at a longitudinal acceleration Xg, while being turned at a lateral acceleration Yg, the grounding load $W_{FI}$ of the inner front wheel during turning of the vehicle and the grounding load $W_{FO}$ of the outer front wheel during turning of the vehicle are given according to the following equations:

$$W_{FI} = Wf/2 - Kf \times Yg - Kh \times Xg \qquad (3)$$

$$W_{FO} = Wf/2 + Kf \times Yg - Kh \times Xg \qquad (4)$$

In addition, if the sum of the grounding loads of the left and right rear wheels is represented by Wr, the grounding load $W_{RI}$ of the inner rear wheel during turning of the vehicle and the grounding load $W_{RO}$ of the outer rear wheel during turning of the vehicle are given according to the following equations:

$$W_{RI}=Wr/2-Kr\times Yg+Kh\times Xg \quad (5)$$

$$W_{RO}=Wr/2+Kr\times Yg+Kh\times Xg \quad (6)$$

In the equations (3) to (6), factors Kf, Kr and Kh are given according to the following equations:

$$Kf=(Gf'\times hg'\times W+hf\times Wf)/tf \quad (7)$$

$$Kr=(Gr'\times hg'\times W+hr\times Wr)/tr \quad (8)$$

$$Kh=hg\times W/(2\times L) \quad (9)$$

Characters used in the above equations are as follows:
  Gf, Gr: Roll rigidity of the front and rear wheels
  Gf', Gr': Distribution of roll rigidity of the front and rear wheels
  Gf'=Gf/(Gf+Gr)
  Gr'=Gr/(Gf+Gr)
  hf, hr: Height of roll center of the front and rear wheels
  hg: Height of center of gravity
  hg': Distance between the center of gravity and the roll axis, hg'=hg−(hf×Wf+hr×Wr)/W
  tf, tr: Tread of the front and rear wheels
  L: Wheel base, L=a+b Provided that the cornering force of a tire is proportional to the grounding load of the tire, the cornering force CFf is given according to the following equation from that grounding load $W_{FI}$ of the inner front wheel during turning of the vehicle, which is given in the equation (3) and that grounding load $W_{FO}$ of the outer front wheel during turning of the vehicle, which is given in the equation (4) and the lateral acceleration Yg:

$$CFf = W_{FI} \times Yg + W_{FO} \times Yg \quad (10)$$
$$= Wf \times Yg - 2 \times kh \times Xg \times Yg$$

In addition, the cornering force CFr of the rear wheel is given according to the following equation wherein the grounding load $W_{RI}$ of the inner rear wheel during turning of the vehicle, is given in the equation (5) and the grounding load $W_{RO}$ of the outer rear wheel during turning of the vehicle, is given in the equation (6) and the lateral acceleration Yg:

$$CFr = W_{RI} \times Yg + W_{RO} \times Yg \quad (11)$$
$$= Wr \times Yg + 2 \times kh \times Xg \times Yg$$

If the equations (10) and (11) are placed into the equation (2), the following equation is provided:

$$M_1 = a \times (Wf \times Yg - 2 \times Kh \times Xg \times Yg) - \quad (12)$$
$$b \times (Wr \times Yg + 2 \times Kh \times Xg \times Yg)$$
$$= (a \times Wf - b \times Wr) \times Yg -$$
$$2 \times Kh \times L \times Xg \times Yg$$

wherein a×Wf−b×Wr=0, and Kh=hg×W/(2×L) from the equation (9), the equation (12) is as follows:

$$M_1=-hg\times W\times Xg\times Yg \quad (13)$$

It can be seen that the moment $M_1$ about the yaw axis, is proportional to the product of the longitudinal acceleration Xg and the lateral acceleration Yg. Therefore, if the driving force and the braking force are distributed to the inner and outer wheels during turning of the vehicle to eliminate the moment $M_1$ about the yaw axis given in the equation (13), the turning stability and the high-speed stability during acceleration or deceleration of the vehicle, when the vehicle is being turned, can be enhanced.

Figure 4:
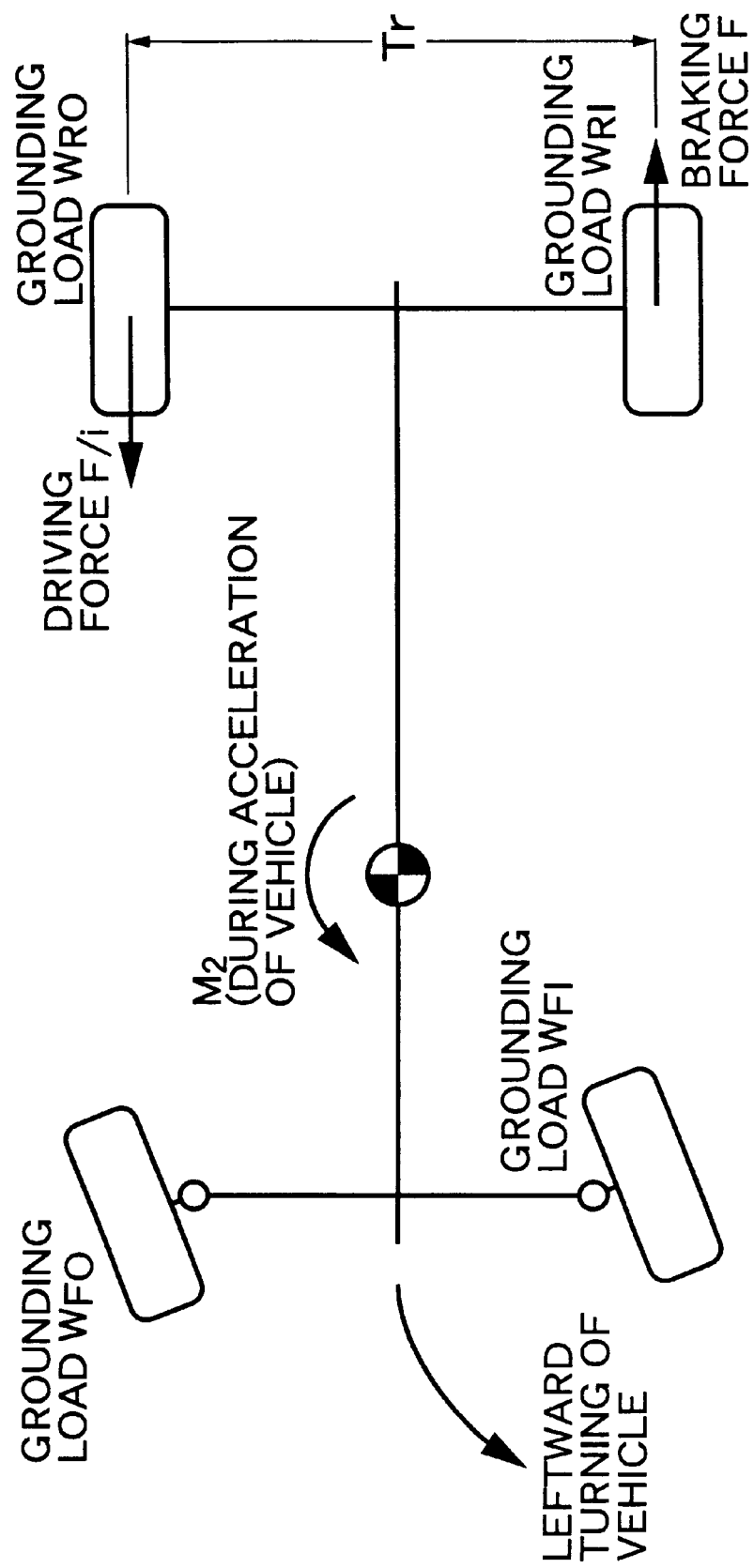
FIG. 4 is an illustration for explaining a yaw moment generated with the engagement of a hydraulic clutch.

On the other hand, for example, when a braking force F is generated in the inner wheel during turning of the vehicle, as shown in FIG. 4, a driving force F/i is generated in the outer wheel during turning of the vehicle, wherein i represents the gear ratio of the gear box 2. A moment $M_2$ about the yaw axis generated in the vehicle by the braking force F and the driving force F/i is given according to the following equation:

$$M_2 = (tr/2) \times F \times \kappa \quad (14)$$
$$= (tr/2) \times (T/R) \times \kappa$$

wherein K=1+(1/i); T is a clutch torque; and R is a radius of a tire.

Therefore, a clutch torque T required to eliminate the moment $M_1$ by the moment $M_2$ is given by establishing $M_1=M_2$ according to the following equation:

$$T=\{2R/(tr\times K)\}\times hg\times W\times Xg\times Yg \quad (15)$$

As apparent from the equation (15), the clutch torque T is a value which is proportional to the product of the longitudinal acceleration Xg and the lateral acceleration Yg. Since it has been assumed in the foregoing description that the cornering force of the tire is proportional to the grounding load of the tire, the clutch torque T is the value which is proportional to the product Xg×Yg of the longitudinal acceleration Xg and the lateral acceleration Yg, but to be exact, the cornering force is not proportional to the grounding load. For this reason, it is preferable that the clutch torque T is handled as a function of the product Xg×Yg of the longitudinal acceleration Xg and the lateral acceleration Yg.

As shown in Table 1, if the first hydraulic clutch $3_L$, when the vehicle is accelerating during leftward turning, is brought into the engaged state, with the clutch torque T given in the equation (15), the opening the first on/off valve $17_L$ is based on the determination provided by the leftward- and rightward-turn determining means 23 and controlling the hydraulic pressure outputted to the regulator valve 16 by the control amount calculating means 36. The number of rotations of the inner wheel during turning of the vehicle, is decreased to generate the braking force F, while the number of rotations of the outer wheel during turning of the vehicle is increased to generate the driving force F/i. Thus, the moment $M_1$ in the direction opposite from the turning direction based on the cornering force, is eliminated to enhance the turning performance. Likewise, if the second hydraulic clutch $3_R$ is brought into the engaged state with the clutch torque T when the vehicle is accelerating during rightward turning thereof, the moment $M_1$ based on the cornering force is likewise eliminated to enhance the turning performance.

If the second hydraulic clutch $3_R$ is brought into the engaged state with the clutch torque T given in the equation (15), when the vehicle is decelerating during leftward turning thereof, the number of rotations of the inner wheel during turning of the vehicle is increased to generate the driving force F, and the number of rotations of the outer wheel during turning of the vehicle is decreased to generate the braking force F/i. Thus, the moment $M_1$ in the same direction as the turning direction based on the cornering force is eliminated to enhance the high-speed stability. Likewise, if the first hydraulic clutch $3_L$ is brought into the engaged state with the clutch torque T given by equation 15, when the vehicle is decelerating during rightward turning thereof, the moment $M_1$ based on the cornering force is likewise eliminated to enhance the high-speed stability.

TABLE 1

|  | Leftward turning | Rightward turning | Effect |
|---|---|---|---|
| During acceleration | Turning-ON of first clutch $3_L$ | Turning-ON of second clutch $3_R$ | Enhancement of turning performance |
| During deceleration | Turning-ON of second clutch $3_R$ | Turning-ON of first clutch $3_L$ | Enhancement of high-speed stability |

Even if the vehicle is accelerating or decelerating during straight traveling thereof, the yaw moment of the vehicle is not varied and hence, the first and second hydraulic clutches $3_L$ and $3_R$ are maintained in their non-engaged state.

If the vehicle is decelerating during turning thereof, the driving force is distributed to inner one of the left and right rear wheels $W_{RL}$ and $W_{RR}$ during turning of the vehicle, and the braking force is distributed to the outer wheel during turning of the vehicle, as described above. Therefore, the moment in the same direction as the turning direction based on the cornering force is eliminated, and the steering characteristic is corrected to an under-steer side. It is desirable for enhancing stability during traveling of the vehicle at a high speed, that the vehicle's steering characteristic is corrected to the under-steer side in the above manner. However, if this is performed during traveling of the vehicle at a low speed, there is a possibility that the turning performance may be reduced to provide a sense of incompatibility to a driver.

In this embodiment, however, if the acceleration or deceleration determining means 31 determines that the vehicle is in a decelerating state, the control amount for the regulator valve 16, namely, the torque amount distributed between the left and right rear wheels $W_{RL}$ and $W_{RR}$ is corrected by the correcting factor Kv determined by the correcting factor determining means 35, and during the traveling of the vehicle at a low speed, the torque amount is controlled, so that it is decreased. As a result, during traveling of the vehicle at a high speed, a greater amount of torque can be distributed between the left and right rear wheels $W_{RL}$ and $W_{RR}$, and during traveling of the vehicle at a low speed, a smaller amount of torque can be distributed to ensure the turning performance of the vehicle, while correcting the steering characteristic to the under-steer side to enhance the high-speed stability.

During acceleration of the vehicle which permits the turning to be assisted by distributing the torque between the left and right rear wheels $W_{RL}$ and $W_{RR}$, a lateral acceleration Yg is calculated using the presumed lateral acceleration $Yg_{12}$ (during acceleration of the vehicle) based on the steering angle θ and the vehicle speed V. Therefore, it is possible to calculate a lateral acceleration Yg reflecting the driver's intention, i.e., the steering angle θ of the steering wheel 13. On the other hand, during deceleration of the vehicle which permits the turning of the vehicle to be inhibited by distributing the torque between the left and right rear wheels $W_{RL}$ and $W_{RR}$, a lateral acceleration Yg is calculated using the presumed lateral acceleration $Yg_{11}$ (during deceleration of the vehicle) based on the yaw rate δ and the vehicle speed V without use of the steering angle θ. Therefore, even if the direction of the steering angle θ outputted by the steering angle sensor $S_3$ does not agree with the actual direction of turning of the vehicle as a result of the counter-steering operation performed by the driver during deceleration of the vehicle, the control of the torque distribution can be properly performed without hindrance.

The above-described embodiment of the present invention may be modified, for example, a front wheel drive vehicle has been illustrated in the embodiment, but the present invention is applicable to a rear wheel drive vehicle and a four-wheel drive vehicle. In addition, the distribution of the torque between the left and right rear wheels $W_{RL}$ and $W_{RR}$ which are follower wheels has been described in the embodiment, but the present invention is applicable to the distribution of the torque between the left and right front wheels $W_{FL}$ and $W_{FR}$ which are driven wheels. In place of the first and second hydraulic clutches $3_L$ and $3_R$, another clutch such as a electromagnetic clutch and a hydraulic coupling can be used. The lateral acceleration Yg has been calculated based on the output signals from both of the lateral acceleration sensor $S_4$ and the yaw rate sensor $S_5$ during deceleration of the vehicle in the embodiment, but only one of the output signals may be used. In calculating the lateral acceleration Yg as the average value between the presumed lateral acceleration $Yg_1$ and the actual lateral acceleration $Yg_2$, the presumed lateral acceleration $Yg_1$ and the actual lateral acceleration $Yg_2$ may be given importance. Further, the acceleration or deceleration determining means 31 may be adapted to determine the deceleration based on the operation of a brake switch.

As discussed above, in the present invention, the yaw moment control system in a vehicle comprises a torque distributing means for distributing the torque between the left and right wheels, a longitudinal acceleration calculating means for calculating the longitudinal acceleration of the vehicle, a torque distribution amount determining means for determining the amount of torque distributed in the direction to inhibit the turning of the vehicle in accordance with the calculated negative longitudinal acceleration. The yaw moment control system includes a vehicle speed detecting means for detecting the vehicle speed, and the torque distribution amount determining means for increasing the amount of torque distributed in the direction to inhibit the turning of said vehicle in accordance with an increase in detected vehicle speed. Therefore, during traveling of the vehicle at a low speed, the turning performance can be ensured without inhibiting the over-steering tendency produced due to the deceleration of the vehicle, and during traveling of the vehicle at the high speed, the over-steering tendency produced due to the deceleration of the vehicle can be inhibited by the distribution of torque to ensure the high-speed stability.

According to a further aspect of the present invention, the yaw moment control system in the vehicle comprises a torque distributing means for distributing the torque between the left and right wheels of the vehicle, a longitudinal acceleration calculating means for calculating the longitudinal acceleration of the vehicle, a lateral acceleration calculating means for calculating the lateral acceleration of the vehicle, a torque distribution amount determining means for determining the amount of torque distributed in accordance with the calculated longitudinal acceleration and the calculated lateral acceleration. When the longitudinal acceleration calculating means calculates a positive longitudinal acceleration, the lateral acceleration calculating means calculates a lateral acceleration in accordance with the output from the steering angle sensor, and when the longitudinal acceleration calculating means calculates a negative longitudinal acceleration, the lateral acceleration calculating means calculates the lateral acceleration in accordance with the output from at least one of the yaw rate sensor and the lateral acceleration sensor. Therefore, during acceleration of the vehicle which permits the turning of the vehicle to be assisted by the distribution of the torque, a steering feeling free from a sense of incompatibility can be obtained using the output from the steering angle sensor reflecting the driver's intention. Even if the actual direction of turning of the vehicle and the output signal from the steering angle sensor disagree with each other by the counter-steering operation during deceleration of the vehicle which permits the turning of the vehicle to be inhibited by the distribution of the torque, such disagreement can be avoided by using the output from at least one of the yaw rate sensor and the lateral acceleration sensor which represents the actual direction of turning of the vehicle.

Although the embodiment of the present invention has been described in detail, it will be understood that various modifications in design may be made without departing from the subject matter of the present invention.

I claim:

1. A yaw moment control system in a vehicle, comprising:

torque distributing means for distributing torque between left and right wheels of the vehicle;

longitudinal acceleration calculating means for calculating the longitudinal acceleration of the vehicle;

lateral acceleration calculating means for calculating the lateral acceleration of the vehicle;

torque distribution amount determining means for determining the amount of torque distributed in a direction to inhibit the turning of the vehicle in accordance with a calculated longitudinal acceleration and a calculated lateral acceleration;

a steering angle sensor for sensing the steering angle of the vehicle;

a yaw rate sensor for sensing the yaw rate of the vehicle;

a lateral acceleration sensor for sensing the lateral acceleration of the vehicle; wherein when said longitudinal acceleration calculating means calculates a positive longitudinal acceleration, said lateral acceleration calculating means calculates the lateral acceleration in accordance with an output from said steering angle sensor, and when said longitudinal acceleration calculating means calculates a negative longitudinal acceleration, said lateral acceleration calculating means calculates the lateral acceleration in accordance with an output from at least one of said yaw rate sensor and said lateral acceleration sensor.

* * * * *